March 30, 1943.  A. R. VAN C. WARRINGTON  2,315,469
PROTECTIVE SYSTEM
Filed March 14, 1941  2 Sheets-Sheet 1

Inventor:
Albert R. van C. Warrington,
by Harry E. Dunham
His Attorney.

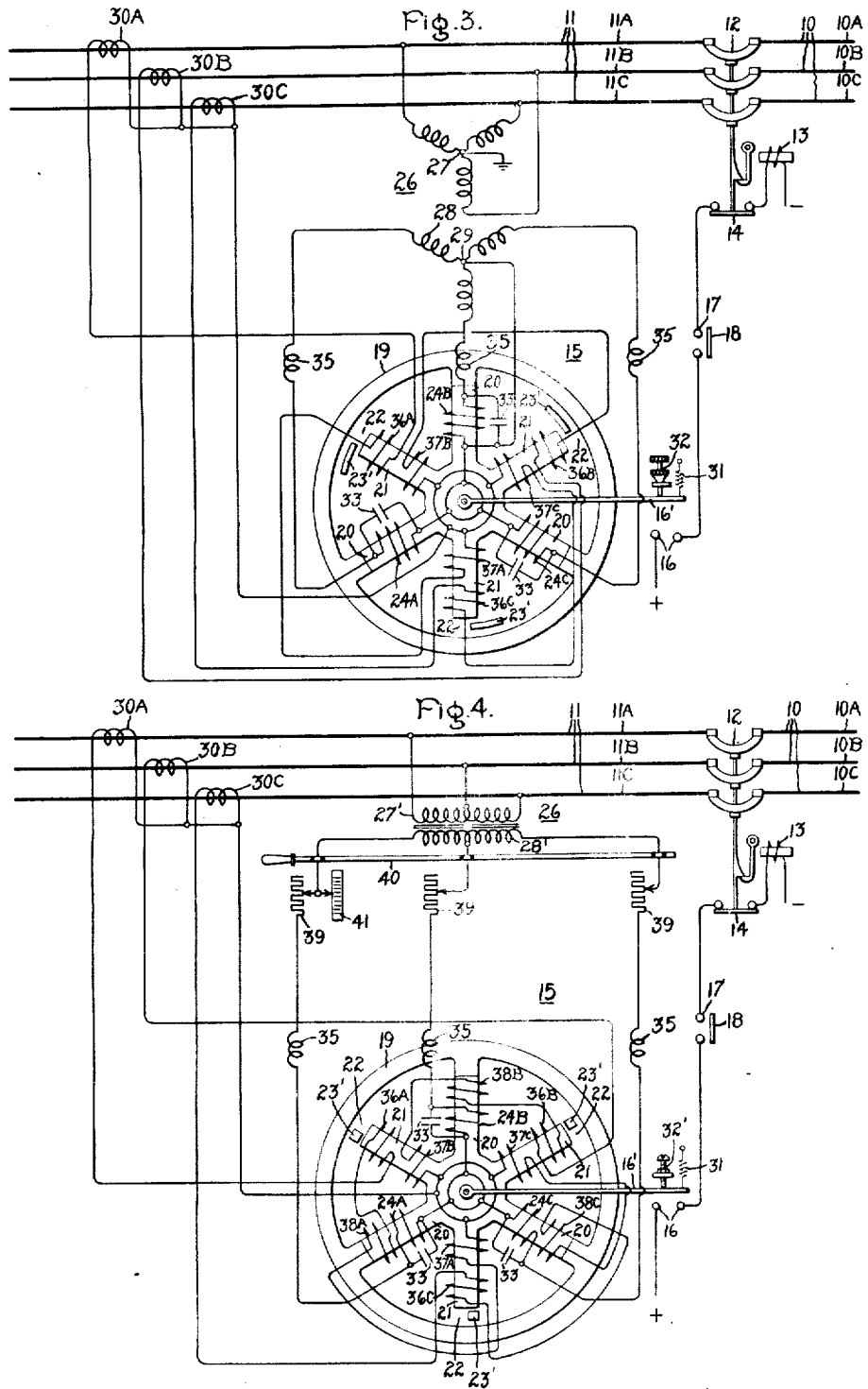

Patented Mar. 30, 1943

2,315,469

UNITED STATES PATENT OFFICE 2,315,469

PROTECTIVE SYSTEM

Albert R. van C. Warrington, Wallingford, Pa., assignor to General Electric Company, a corporation of New York Application March 14, 1941, Serial No. 383,307

14 Claims. (Cl. 175—294)

My invention relates to protective systems for electric circuits and more particularly to relays of the distance type employed in such protective systems.

In my copending application, Serial No. 375,207, filed January 21, 1941, and assigned to the same assignee as the present application, I have disclosed and broadly claimed a polyphase distance relay including only a single movable element having the same reach for all kinds of faults, which relay might be of the induction-cup, induction-disk, or induction dynamometer type. The present invention is specifically concerned with a protective system employing a new and improved polyphase distance relay of the induction dynamometer type having a single movable element which is not only more efficient than arrangements of the prior art but is very compact, simple, and rugged in construction.

Accordingly, it is an object of my invention to provide a protective system for an electric circuit employing a new and improved polyphase distance relay of the induction dynamometer type.

It is another object of my invention to provide a new and improved polyphase ohm unit of the induction dynamometer type having a single movable element.

It is a further object of my invention to provide an induction dynamometer type of polyphase distance relay which requires a minimum amount of panel space, eliminates all risk of false measurement, and has a much lower cost than the devices for performing similar functions heretofore.

Further objects and advantages of my invention will become apparent as the following description proceeds and the fetaures of novelty which characterize my invention will be pointed out with particularity in the claims annexed to and forming a part of this speciection.

Figure 1:
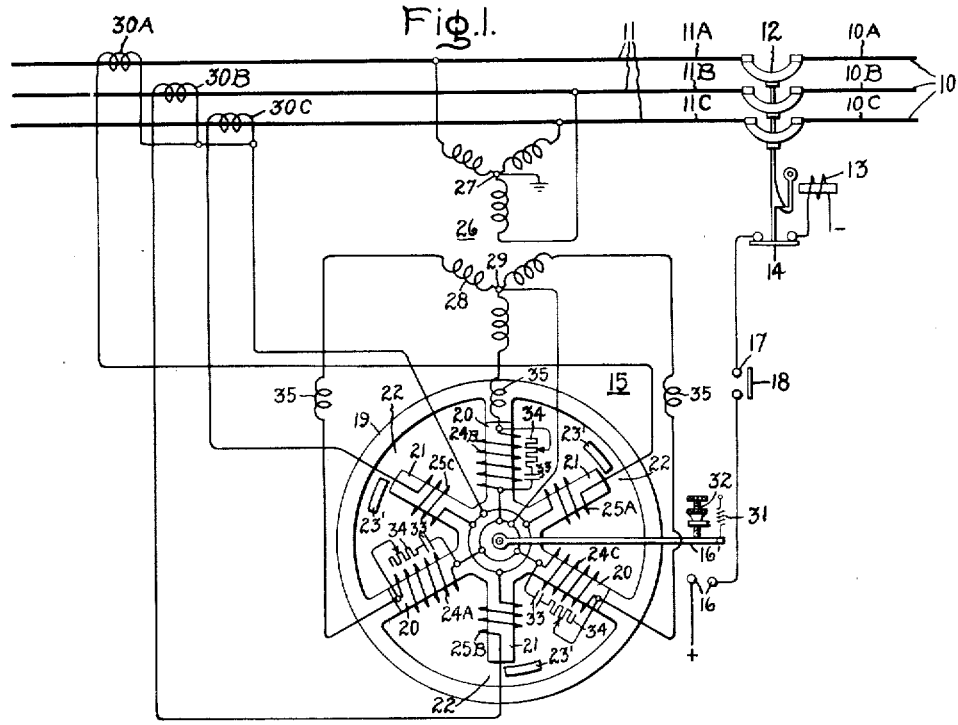
Figure 2:
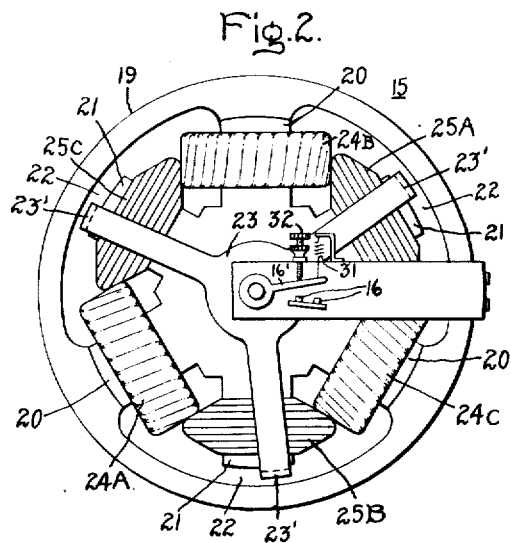

For a better understanding of my invention, reference may be had to the accompanying drawings in which Fig. 1 is a schematic diagram of a protective system illustrating one embodiment of my invention, Fig. 2 is a view of the induction dynamometer type relay illustrated schematically in Fig. 1 to show the structural details thereof, and Figs. 3 and 4 are schematic diagrams of protective systems embodying modifications of my invention.

Referring now to Fig. 1, I have illustrated my invention as applied to a three-phase alternating-current system. As shown, the system comprises a three-phase bus $10$ including the respective phase conductors $10_A$, $10_B$, $10_C$ connected through a suitable circuit-interrupting means such as a latched closed circuit breaker $12$ to a three-phase transmission line or circuit to be protected $11$ including the corresponding phase conductors $11_A$, $11_B$, and $11_C$. The circuit breaker $12$ is illustrated as provided with a trip coil $13$ and an auxiliary switch $14$, which is closed when the circuit breaker is closed and open when the circuit breaker is open.

In order to isolate the polyphase circuit or transmission line $11$ from the associated bus system $10$ upon the occurrence of a fault thereon, I have provided an electro-responsive device generally indicated at $15$ and specifically illustrated as a polyphase ohm unit of the reactance type which is adapted under predetermined fault conditions to cause bridging member $16'$ to bridge contacts $16$ connected in the circuit of trip coil $13$. The circuit of trip coil $13$ preferably includes the contacts $17$ adapted to be bridged by the member $18$ which is preferably controlled by a polyphase power directional unit, not shown, such as that disclosed and claimed in United States Letters Patent 2,110,673, granted March 8, 1938, upon an application of Andrew J. McConnell, and assigned to the same assignee as the present application, or by a polyphase directional unit similar to the electro-responsive device of Fig. 1 as will be apparent from the following description, so that tripping of circuit breaker $12$ will not occur by virtue of the operation of electroresponsive device $15$ unless the fault is on the protected section $11$.

In accordance with my invention, electroresponsive device $15$ comprises an induction dynamometer construction somewhat similar to the arrangement disclosed and claimed in my prior Patent 2,000,803, granted May 7, 1935, and assigned to the same assignee as the present application. In the present polyphase induction dynamometer construction, however, a movable multiple loop winding is provided wherein there is induced a current by transformer action with one or more suitably energized windings. This current induced in the multiple loop winding coacts with the magnetic flux of one or more suitably energized windings to produce a torque for controlling the movement of the multiple loop winding according to a desired relation between the electric quantities energizing the windings.

Referring particularly to Figs. 1 and 2, I have illustrated a magnetic structure $19$ in the form of a hollow stator preferably of laminated construction including a plurality of radially extending poles 20 and 21, respectively, extending from a central hub portion in much the same form as the spokes of a wheel. Although the radially extending poles 20 are provided without air gaps, each of the radially extending poles 21 is provided with an air gap 22 for a purpose which will become apparent from the following description. Magnetic stator 19 is illustrated as comprising three radially extending poles 20 without air gaps, which will be referred to hereinafter as "potential poles," and three radially extending poles 21 with air gaps 22, which will hereinafter be referred to as "current poles" because this arrangement of the magnetic structure lends itself admirably to the protection of three-phase circuits.

Associated with the hollow magnetic stator 19 is a single multiple loop movable winding 23 which is illustrated as a three-branched current-conducting member, any two branches of which, or any one branch in connection with the shaft which electrically connects the upper and lower junctions of the three branches, would constitute a short circuited loop. In other words, the multiple loop winding is constructed so that the intersection of the winding with any plane perpendicular to the axis of rotation thereof will produce a figure having symmetry about the axis of rotation, or a single plane perpendicular to the axis of movement of the winding will intersect all of the loops of the multiple loop winding. Specifically, movable multiple loop winding 23 is illustrated as comprising two axially spaced Y-shaped conducting members having the ends thereof integrally connected by interconnecting members 23' which are adapted to move in the air gaps 22 of radially extending poles 21. Multiple loop winding 23 could also take the form of three separate conducting rings mounted on one shaft, the inside portions of each of the loops being adjacent to the shaft and either electrically connected thereto or insulated therefrom. In other words, the respective loops of the multiple loop winding are arranged to lie in planes which intersect along the axis of rotation of the winding.

In order to produce a torque on the multiple loop winding 23, each of the potential poles 20 is provided with a winding 24 specifically designated as 24A, 24B, 24C to indicate the particular phase of transmission line 11 with which they are associated and each of the current poles 21 is provided with a winding 25 specifically designated as 25A, 25B, 25C for the same reason as windings 24. If the potential windings are energized with line-to-neutral voltages of power line 11 and the current windings 25 are energized in response to the line currents of power line 11, a torque will be produced tending to move multiple loop 23 to its center position within air gap 22. Accordingly, I provide a potential transformer 26, which is illustrated as having a Y-connected primary winding 27 having the terminals thereof connected to a transmission line 11 and a Y-connected secondary winding 28 having the respective terminals thereof connected to one end of a different one of the potential windings 24 while the neutral terminal 29 thereof is connected to the other end of all of the potential windings 24. It will, of course, be understood by those skilled in the art that the neutral connection might be eliminated. The current windings 25 are arranged to be connected to one terminal of the corresponding secondary windings 30A, 30B, and 30C of suitable current transformers associated with transmission line 11. These current transformers are illustrated as having their secondary windings connected in Y relationship with the neutral terminal thereof connected to the other end of all of the current windings 25.

The torque exerted on the multiple loop winding 23 comprises an $I^2$ torque which is obtained by starting it away from the center of current poles 21 provided with air gaps 22 the magnitude of this $I^2$ torque being dependent upon the position of the multiple loop winding in regard to its neutral position with respect to air gaps 22 or the center of the poles 21. When the multiple loop winding is located in its neutral position, that is, centrally with respect to current poles 21, then the $I^2$ torque is zero. With the loop displaced to one side of the center of the poles, the $I^2$ torque is in one direction and, when displaced to the other side of the center of the poles, the $I^2$ torque is in the other direction. It will be obvious to those skilled in the art that this arrangement will provide a suitable power directional relay as referred to above for controlling member 18 adapted to bridge contacts 17. However, in order to operate the apparatus as a polyphase ohm unit, I provide a suitable spring means 31 for biasing the multiple loop winding in a counterclockwise direction away from the center of the poles and the $I^2$ or operating torque may be controlled by the positioning of an adjustable backstop 32.

A suitable restraining torque on multiple loop winding 23 is also obtained which is proportional to a function of the flux in one pole multiplied by the difference of the fluxes in the two poles on either side thereof, in other words, the restraining torque will be proportional to $I(E_1-E_2)f(\phi)$, where I represents the current flux appearing in one pole, $E_1$ and $E_2$ represent the potential fluxes in the poles on either side thereof, respectively, and $\phi$ represents the angular relationship between the current and one of the potentials involved in producing these fluxes.

In order that polyphase ohm unit 15 responds to the reactance of the circuit, it is desirable that this $f(\phi)$ is a sine function. Accordingly, in order to have the desired sine function as well as to satisfy other conditions, I connect in parallel with each of the potential windings 24 a capacitor 33 and an adjustable resistor 34. Also, I connect in series with potential windings 24 and the parallel connected capacitor 33 and resistor 34 a suitable inductance 35. Because multiple loop winding 23 encircles the magnetic structure upon which potential windings 24 are wound, the potential windings have no reactance and afford a substantially pure resistance characteristic. Accordingly, it is necessary to provide external inductance 35 which is so proportioned with respect to capacitor 33 and the resistance of the potential circuit as to have this circuit resonant at unity power factor in order to enable the unit to respond only to the reactive component of the ohmic measurement and further to make the potential circuit dead beat so as to prevent incorrect operation in the event of sudden changes in the line voltages when a fault occurs and also to make the current in the potential circuit at a given voltage of such a value as to cause the unit to operate at a desired ohmic value. These three conditions can readily be fulfilled because there are three variables involved, namely, (1) phase angle, (2) power input to obtain the desired ohmic pickup, and (3) dead beat condition, which may be included in three independent equations as disclosed in my prior United States Letters Patent 2,131,608, granted September 27, 1938, and assigned to the same assignee as the present application. The adjustable resistor 34 is included primarily to provide fine control for satisfying the three conditions enumerated above.

The operation of the protective system illustrated in Fig. 1 will be obvious to those skilled in the art. The backstop 32 will be properly adjusted when the polyphase ohm unit is installed to produce the desired $I^2$ torque and, consequently, to provide the desired reactance setting of the polyphase unit. In the event that a fault occurs on the protected portion of transmission line 11, member 18 controlled by a polyphase power directional relay, not shown, will bridge contact 17, and, if the fault exists within the reactance setting of the polyphase reactance ohm unit 15, multiple loop winding 23 will be rotated in a clockwise direction so as to cause bridging member 16' to bridge contact 16 and energize the tripping circuit of circuit breaker 12.

The arrangement described thus far will respond to all types of faults which might exist on transmission line 11 regardless of the number of conductors involved and whether or not the fault involves ground. However, the distance response of electroresponsive device 15 of Fig. 1 is not the same for all types of faults, the arrangement having the same reach for three-phase faults as for single line-to-ground faults but having a shorter reach in the case of line-to-line faults. If it is desired to have precisely the same distance response for all types of faults which might occur on transmission line 11, it will be necessary to provide three separate loop windings on a single shaft, if the induction dynamometer construction is desired, as disclosed and claimed in my copending application, Serial No. 375,207, referred to above.

Where it is desired to protect only against faults not involving ground, I have found that an electroresponsive device having a single movable multiple loop winding, such as is disclosed in Figs. 1 and 2, may be provided which will give the same distance response for all phase faults independently of the number of conductors involved in the fault. Accordingly, in Fig. 3, I have disclosed a protective system in which the corresponding parts thereof are designated by the same reference numerals as in Fig. 1. As in Fig. 1, the potential windings 24 are energized with line-to-neutral potentials. In view of the space limitations, the adjustable resistor 34 has not been illustrated in Fig. 3 but it will be understood by those skilled in the art that the presence of such a resistor is desirable. Instead of energizing the current poles 21 with a flux proportional to line currents, in Fig. 3 each of the current poles 21 is provided with two windings 36 and 37 so energized from the secondary windings 30A, 30B, and 30C of the current transformers associated with transmission line 11 as to produce an effective delta current flux in current poles 21. The windings 36 and 37 are designated by the appropriate subscripts A, B, or C to denote the particular phase of transmission line 11 with which they are associated. The current flowing in the windings 37 produces a flux which subtracts from the flux produced by the windings 36.

In my copending application, Serial No. 375,207, referred to above, it was shown that, if the single movable element of a polyphase ohm unit has applied thereto an operating torque proportional to $(I_1')^2 + (I_2')^2$ and a restraining torque proportional to $V_1' I_1' \sin \phi_1 + V_2' I_2' \sin \phi_2$, then the ratio of the latter to the former is equal to $X_1'$ for three-phase and line-to-line faults, where $I_1'$ and $I_2'$ are the magnitudes of the positive and negative-phase-sequence currents, respectively, flowing in the circuit at the relay a variable distance from the fault, $V_1'$ and $V_2'$ are the magnitudes of the positive and negative-phase-sequence voltages at the relay, $\phi_1$ and $\phi_2$, respectively, are the angles between the positive and negative-phase-sequence currents and voltages, and $X_1'$ is the positive-phase-sequence reactance between the relay and the fault. With the windings energized as illustrated in Fig. 3, it can be shown that a restraining torque is exerted on multiple loop winding 23 which is proportional to $V_1' I_1' \sin \phi_1 + V_2' I_2' \sin \phi_2$. Furthermore, by displacing the multiple loop winding from the center of the air gap, the $I_2$ torque exerted thereon can be shown to be proportional to $(I_1')^2 + (I_2')^2$. The electroresponsive device 15, therefore, will have the same distance response for all faults not involving ground. It can also be shown that, for single line-to-ground faults, no torque will be exerted on multiple loop winding 23 and, for double line-to-ground faults, the relay will not reach out as far as for line-to-line faults or three-phase faults. This is of no consequence, however, since these faults would be taken care of by suitable ground fault relays.

The operation of the arrangement disclosed in Fig. 3 will be obvious to those skilled in the art in view of the detailed description included above.

In Figs. 1 and 3, the operating torque or, in other words, the $I^2$ torque tending to rotate multiple loop winding 23 in a clockwise direction is obtained by virtue of the centering tendency of multiple loop winding 23 and the magnitude of this torque is dependent upon the adjustment of backstop 32. In practice, it is desirable to manufacture distance relays which can be set according to a formula which relates to the distance in ohms to be measured by the relay to a calibrating scale of adjustment. In order to make all relays fit this formula, they should all be alike with respect to ohmic response. This, of course, is not possible without an auxiliary adjustment because of the variations in material, quality, manufacturing tolerances and the like. Consequently, it would be desirable to provide an auxiliary adjustment which can be used by the manufacturer to maintain uniformity of the product and provide additional means for adjusting the ohmic response of the device in dependence upon the application thereof.

In Fig. 4, I have illustrated an alternative arrangement for producing the $I^2$ operating torque. The corresponding parts of Fig. 4 are designated by the same reference numerals as in Fig. 3. The potential windings 24 of Fig. 4 are identical with those shown in Fig. 3 as are also the current windings 36 and 37. However the $I^2$ torque or operating torque on the multiple loop winding 23 is produced by means of current windings 38, one of which is provided on each potential pole 20. These windings are designated by the appropriate subscripts A, B, and C to designate the line current with which they are energized. It will be observed that the line current with which the current windings 38 are energized corresponds with the line-to-neutral voltage used to energize the corresponding potential windings 24. In the arrangement disclosed in Fig. 4, the operation of the electroresponsive device 15 is improved and the means of obtaining the proper characteristics of the device is facilitated if the multiple loop winding 23 and particularly the portions 23' thereof can move in an area of constant flux. This can readily be accomplished in the case of Fig. 4 since the I² torque is no longer dependent upon the amount of displacement of multiple loop winding 23 from its neutral position. Accordingly, in Fig. 4, the portions 23' of multiple loop winding 23 are shown of considerably less width than in Figs. 1, 2, and 3 and, furthermore, this winding is arranged to move only a short distance so that the flux density may be constant over its path of operation. I have found that a movement of $\tfrac{1}{32}$ of an inch is adequate for the purpose and suitable for obtaining the desired speed and, at the same time, sufficient for providing the necessary contact gap to keep the trip circuit open under normal conditions.

In the arrangement disclosed in Fig. 4, a less elaborate adjustable stop 32' is provided for factory adjustment only, so that all of the distance relays manufactured have the same initial characteristics. In order to adapt the electroresponsive device 15 to the particular system to be protected, I provide adjustable resistors 39 which are shown to be connected in series with the potential windings 24 of electroresponsive device 15. A suitable operating means 40 for simultaneously adjusting resistors 39 is provided as well as a scale 41 which will enable the operator to read the ohmic setting of the electroresponsive device directly in ohms.

In Fig. 4, potential transformer 26 is illustrated as having an open delta primary winding 27' and an open delta secondary winding 28' rather than the Y-connected primary windings 27 and 28 of Figs. 1 and 3. It will be understood by those skilled in the art that either transformer arrangement might be used.

While I have illustrated and described certain particular embodiments of my invention, it will be understood that modifications thereof will occur to those skilled in the art. I desire it to be understood, therefore, that my invention is not limited to the particular arrangements disclosed and I intend in the appended claims to cover all modifications and changes which fall within the true spirit and scope of my invention.

What I claim as new and desire to secure by Letters Patent of the United States is:

1. In a distance-responsive relay for protecting a polyphase alternating-current circuit, having only one movable member comprising a multiple loop winding for operating a control circuit, the loops of said multiple loop winding being so constructed and arranged that all of the loops thereof may be intersected by a single plane perpendicular to the axis of movement of said movable member, means for applying torques to said movable member including current and potential windings, means for energizing said windings from said polyphase alternating-current circuit to cause operation of said distance-responsive relay in response to different types of faults which might occur on said circuit.

2. In an electroresponsive device for an electric circuit, a multiple loop winding mounted for limited pivotal movement and means for exerting thereon a torque substantially proportional to the sum of the squares of predetermined phase-sequence currents of said circuit and an opposing torque substantially proportional to the sum of predetermined reactive phase-sequence components of power.

3. In an electroresponsive device for an electric circuit, a multiple loop winding mounted for limited pivotal movement and means for exerting a resulting torque on said winding in response to a fault on said electric circuit which is substantially proportional to the difference between the sum of the squares of the positive and negative phase-sequence currents of said circuit and the sum of the positive and negative phase-sequence components of reactive power of said circuit.

4. In combination with a polyphase alternating-current electric circuit, circuit-interrupting means for controlling said circuit, a polyphase electroresponsive device having a single rotatable element comprising a multiple loop winding for controlling said circuit-interrupting means, the loops of said multiple loop winding being so constructed and arranged that the intersection of said rotatable element with any plane perpendicular to the axis of rotation thereof will produce a figure having symmetry about said axis and means for energizing said electroresponsive device from said polyphase alternating-current circuit to control said circuit-interrupting means in response to different types of faults which might occur on said circuit.

5. In an electroresponsive device for protecting an alternating-current electric circuit, a magnetic structure, current and potential windings associated with said magnetic structure, a single rotatable element comprising a multiple-loop winding associated in torque-producing relationship with said magnetic structure and mounted for limited pivotal movement with respect thereto, means for energizing said current and potential windings from said alternating-current circuit, and means for holding said multiple-loop winding in a predetermined position other than the neutral position under normal conditions of operation of said alternating-current electric circuit, said current and potential windings and said magnetic structure being arranged so that the torque for operating said electroresponsive device is dependent upon the predetermined position in which said multiple-loop winding is held.

6. In an electroresponsive device for protecting an alternating-current electric circuit, a magnetic structure, current and potential windings associated with said magnetic structure, a single rotatable element comprising a multiple-loop winding associated in torque-producing relationship with said magnetic structure and mounted for limited pivotal movement with respect thereto, means for energizing said current and potential windings from said alternating-current circuit, means for holding said multiple-loop winding in a predetermined position other than the neutral position under normal conditions of operation of said alternating-current electric circuit dependent upon the desired operation of said device, said current and potential windings and said magnetic structure being arranged so that the torque for operating said electroresponsive device is dependent upon said predetermined position in which said multiple-loop winding is held, and adjustable means for controlling said predetermined position.

7. A polyphase distance-responsive alternating-current device for protecting an alternating-current circuit including a magnetic structure, a single movable multiple-loop winding associated in torque-producing relationship with said magnetic structure, a plurality of current and potential windings on said magnetic structure, and means for energizing said windings from said alternating-current circuit so that said polyphase device has the same distance response for all fault conditions on said alternating-current circuit involving more than one conductor but not involving ground.

8. A polyphase electroresponsive device of the distance type including a magnetic structure having a plurality of radially extending poles provided with air gaps therein, a plurality of current and potential windings associated with said magnetic structure and energized so to to produce a flux in said air gaps, a single rotatable element comprising a multiple-loop winding associated in torque-producing relationship with said magnetic structure and mounted for limited movement so that portions thereof move in said air gaps, the energization of said current and potential windings being such that said element tends to assume a neutral position with respect to said air gaps, means normally tending to bias said element away from said neutral position, said windings and magnetic structure being so constructed and arranged to produce a torque on said element for overcoming said last-mentioned means when a predetermined relationship exists between the currents and potentials energizing said windings.

9. In a polyphase electroresponsive device of the distance type for protecting an alternating-current electric circuit, a magnetic structure having a plurality of radially extending poles, alternate ones of which are provided with air gaps, a plurality of current windings associated with said alternate poles provided with air gaps, a plurality of potential windings associated with said other poles, a single rotatable element comprising a multiple-loop winding associated in torque-producing relationship with said magnetic structure and mounted for limited movement in said air gaps, means for energizing said current and potential windings from said alternating-current circuit so as to cause said element to assume a neutral position with respect to said air gaps, spring means normally biasing said element away from said neutral position, said current and potential windings and magnetic structure being so constructed and arranged to produce a torque opposing and overcoming said spring means whenever any fault condition not involving ground occurs on said alternating-current circuit within a predetermined distance from said electroresponsive device.

10. In a polyphase electroresponsive device of the distance type for protecting an alternating-current electric circuit, a magnetic structure having a plurality of radially extending poles, alternate ones of which are provided with air gaps, a plurality of current windings associated with said alternate poles provided with air gaps, a plurality of potential windings associated with said other poles, a single rotatable element comprising a multiple-loop winding associated in torque-producing relationship with said magnetic structure and mounted for limited movement in said air gaps, means for energizing said current and potential windings from said alternating-current circuit so as to cause said element to assume a neutral position with respect to said air gaps, means normally biasing said element away from said neutral position, and current windings associated with said other poles and energized in such a manner from said alternating-current circuit to cause a torque to be produced overcoming said last-mentioned means whenever any fault condition not involving ground occurs on said alternating-current circuit within a predetermined distance from said electroresponsive device, whereby said device has the same reach for all faults not involving ground.

11. In a polyphase electroresponsive device of the distance type for protecting an alternating-current electric circuit, a magnetic structure having a plurality of radially extending poles provided with air gaps therein, a plurality of current and potential windings associated with said magnetic structure and energized so as to produce a flux in said air gaps, a single rotatable element comprising a multiple-loop winding associated in torque-producing relationship with said magnetic structure and mounted for limited movement so that portions thereof move only within a field of substantially constant flux within in said air gaps, means for energizing said current and potential windings from said alternating-current circuit to cause said element to tend to assume a neutral position with respect to said air gaps, means for normally biasing said element away from said neutral position, and means for overcoming the operation of said last-mentioned means whenever any fault condition not involving ground occurs on said alternating-current circuit within a predetermined distance from said electroresponsive device.

12. In combination with a polyphase alternating current electric circuit, circuit interrupting means for controlling said circuit, a polyphase electroresponsive device having a single rotatable element comprising a multiple loop winding for controlling said circuit interrupting means, said multiple loop winding being so constructed and arranged that the respective loops of said winding lie in planes which intersect along the axis of rotation of said rotatable element, and means for energizing said electroresponsive device from said polyphase alternating current circuit to control said current interrupting means in response to different types of faults which might occur on said circuit.

13. In combination with a polyphase alternating current electric circuit, circuit interrupting means for controlling said circuit, a polyphase electroresponsive device having a single rotatable element comprising a multiple loop winding for controlling said circuit interrupting means, said multiple loop winding comprising a plurality of loops, the electrical circuit of each loop being completed through one or more of the remaining loops, and means for energizing said electroresponsive device from said polyphase alternating current circuit to control said circuit interrupting means in response to different types of faults which might occur on said circuit.

14. In an electroresponsive device for controlling a polyphase alternating current circuit having a single movable member rotatable about an axis, said movable member comprising a multiple loop winding for operating a control circuit, the loops of said multiple loop winding being so constructed and arranged that all said loops may be intersected by a single plane perpendicular to said axis, means for applying torques to said movable member including current and potential windings, means for energizing said windings from said polyphase alternating current circuit to cause operation of said electroresponsive device upon the occurrence of different types of faults on said circuit.

ALBERT R. van C. WARRINGTON.

2,315,469

CERTIFICATE OF CORRECTION.

Patent No. 2,315,469. March 30, 1943.

ALBERT R. van C. WARRINGTON.

It is hereby certified that error appears in the printed specification of the above numbered patent requiring correction as follows: Page 3, second column, line 18, for "$I_2$" read --$I^2$--; page 5, first column, line 10, for "so to to" read --so as to--; and that the said Letters Patent should be read with this correction therein that the same may conform to the record of the case in the Patent Office.

Signed and sealed this 11th day of May, A. D. 1943.

(Seal)

Henry Van Arsdale,
Acting Commissioner of Patents.